United States Patent
Gupta et al.

(10) Patent No.: US 7,366,655 B1
(45) Date of Patent: Apr. 29, 2008

(54) METHOD OF GENERATING A LABELING GUIDE FOR SPOKEN DIALOG SERVICES

(75) Inventors: Narendra K. Gupta, Dayton, NJ (US); Barbara B. Hollister, Mountainside, NJ (US); Mazin G Rahim, Warren, NJ (US); Giuseppe Riccardi, Hoboken, NJ (US)

(73) Assignee: AT&T Corp., New York, NY (US)

( * ) Notice: Subject to any disclaimer, the term of this patent is extended or adjusted under 35 U.S.C. 154(b) by 1016 days.

(21) Appl. No.: 10/405,858

(22) Filed: Apr. 2, 2003

(51) Int. Cl.
*G06F 17/27* (2006.01)
*G06F 17/21* (2006.01)

(52) U.S. Cl. .......................................... 704/9; 704/10
(58) Field of Classification Search .................. None
See application file for complete search history.

(56) References Cited

U.S. PATENT DOCUMENTS

| | | | | |
|---|---|---|---|---|
| 6,061,675 A | * | 5/2000 | Wical | 706/45 |
| 6,311,150 B1 | * | 10/2001 | Ramaswamy et al. | 704/1 |
| 6,950,793 B2 | * | 9/2005 | Ross et al. | 704/9 |
| 7,080,004 B2 | * | 7/2006 | Wang et al. | 704/9 |
| 7,092,888 B1 | * | 8/2006 | McCarthy et al. | 704/277 |
| 7,127,402 B2 | * | 10/2006 | Ross et al. | 704/275 |
| 2002/0116171 A1 | * | 8/2002 | Russell | 704/4 |
| 2003/0018470 A1 | * | 1/2003 | Golden et al. | 704/10 |
| 2003/0212543 A1 | * | 11/2003 | Epstein et al. | 704/9 |
| 2003/0212544 A1 | * | 11/2003 | Acero et al. | 704/9 |

* cited by examiner

*Primary Examiner*—David Hudspeth
*Assistant Examiner*—Brian L. Albertalli

(57) ABSTRACT

A method is disclosed for designing a labeling guide for use by a labeler in labeling data used for training a spoken language understanding (SLU) module for an application. The method comprises a labeling guide designer selecting domain-independent actions applicable to an application, selecting domain-dependent objects according to characteristics of the application, and generating a labeling guide using the selected domain-independent actions and selected domain-dependent objects. An advantage of the labeling guide generated in this manner is that the labeling guide designer can easily port the labeling guide to a new application by selecting a set of domain-independent action and then selecting the domain-dependent objects related to the new application.

6 Claims, 2 Drawing Sheets

METHOD OF GENERATING A LABELING GUIDE FOR SPOKEN DIALOG SERVICES

BACKGROUND OF THE INVENTION

1. Field of the Invention

The present invention relates to spoken dialog systems and more specifically to methods of designing and implementing labeling guides associated with spoken dialog services.

2. Introduction

Building spoken dialog systems is a complicated and time-consuming process. The various modules necessary to carry on a meaningful conversation between a person and a spoken dialog system include an automatic speech recognition module, a spoken language understanding module, a dialog manager, and a text-to-speech language generation module. When a spoken dialog system for a particular domain is developed, the developers must train the various components to recognize and interact appropriately for the particular domain. For example, if the domain relates to an airline reservation service, each module must be trained to recognize and expect input from users related to air travel and reservations. The present invention relates to the process of training the spoken language understanding module of a spoken dialog system.

Most spoken language understanding (SLU) modules need some kind of internal representation of meaning that enables it to appropriately interpret and identify the meaning or intent of user input. The internal representation is typically organized into semantic classes. For example, to represent an entity type such as a person in a dialog, the person can be referred to in terms of her name (Betty), a pronoun (Her or She) or her relationship to others Joe's manager). Thus three semantic classes can be derived from this entity type. For each spoken dialog application, the organization of the semantic classes for the potential entity types encountered in dialogues must be designed and then a large amount of training data is needed to build the semantic classifier models. For more information on semantic representations, see Huang, Acero and Hon, *Spoken Language Processing*, Prentice Hall, 2001, pages 867-880.

Producing the training data is a difficult and time-consuming process and is pivotal for the success of the application. Generating the training data requires recording a large number of user utterances, transcribing them and then labeling each one with appropriate semantic class or classes. Before labeling can be done, however, a person designs a set of semantic labels needed for the application. FIG. 1 illustrates a known process of generating a labeling guide. The set of semantic labels or tags used for the labeling guide is shown as step 102. The semantic label meanings along with both positive and negative examples are documented. The documentation is organized into a detailed labeling guide (104) that is then provided to labelers to follow during an implementation phase (106). Trained labelers then carry out the physical task of labeling the data. For every application, this process must be started from scratch (108), and labelers must be retrained.

The typical process of generating training data, designing semantic labels and manual labeling of training data is a very expensive process. In addition, the process also introduces the opportunity of labeling errors, at least in the early phase of the learning cycle. Because of the highly specialized nature of each spoken dialog system, the data labeled for one application cannot be used for any other application; and if the functionality of the application needs to be extended or modified, new labels must be designed and data must be labeled again. The ultimate goal of the semantic labeling process is to train the SLU module to determine the appropriate action or responsive statement based on the received user utterance.

SUMMARY OF THE INVENTION

The present invention addresses the inherent cost and expense of designing labeling guides for labelers to use when labeling data for use by the SLU module. Such a trained SLU module may then be implemented into a spoken dialog service or any other kind of application. The invention provides a design and implementation scheme that can be reused across applications and that reduces the need of re-training the labelers and re-labeling of the data when an application needs to be extended or modified.

The preferred embodiment of the invention relates to a method of designing a labeling guide for use by a labeler in labeling data used for training a spoken language understanding (SLU) module for an application. Such a guide may be used for modules beyond just SLU modules. The method comprises a labeling guide designer selecting domain-independent actions applicable to an application, selecting domain-dependent actions and/or objects (all elements that may be selected are generically referred to herein as "objects") according to characteristics of the application, and generating a labeling guide using the selected domain-independent actions and selected domain-dependent objects. An advantage of the labeling guide generated in this manner is that the labeling guide designer can easily port the labeling guide to a new application by selecting a set of domain-independent action and then selecting the domain-dependent objects related to the new application.

In some cases, a pre-existing set of domain-independent actions may exist from which the labeling guide designer can select those related to the present application. Similarly, a company or entity for which a spoken dialogue application is being developed may have pre-existing documentation on domain-dependent objects from which the labeling guide designer can easily select domain-dependent data for the labeling guide.

An advantage of the present invention includes a more efficient process for generating a labeling guide used by labelers in the implementation phase of a spoken dialogue service or other system that uses a spoken language understanding unit. This advantage is expressly not to be incorporated as a required limitation of the claimed limitations but reflects one of many potential general contexts in which the claimed invention may apply. It is appreciated that the principles of the present invention may also be applied to other modules within a spoken dialog system that require training, such as an automatic speech recognition (ASR) module or a text-to-speech (TTS) module.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention addresses the cost and lack of efficiency in known method of generating a labeling guide. Instead of starting from scratch with each new application for which a labeling guide must be generated, the present invention enables a labeling guide designed as disclosed herein to be ported or used for new applications by requiring labeling guide designers to modify a smaller set of data that relates to the new application or new domain. In this regard, the designer of the labeling guide has a reduced workload and can more quickly and efficiently design the labeling guide for new applications.

Figure 1:
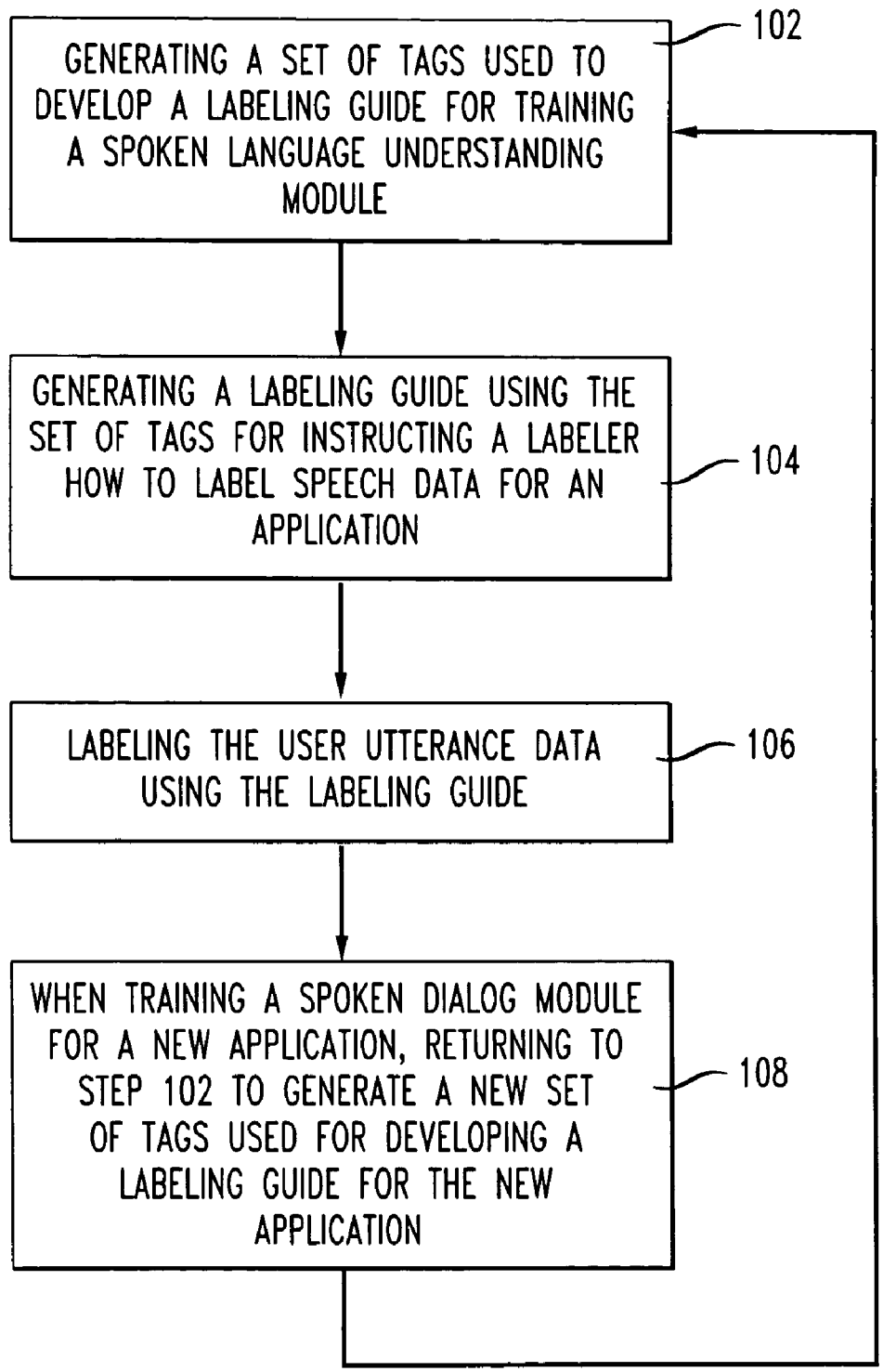
FIG. 1 illustrates a known process for generating a labeling guide for use by a labeler.
Figure 2:
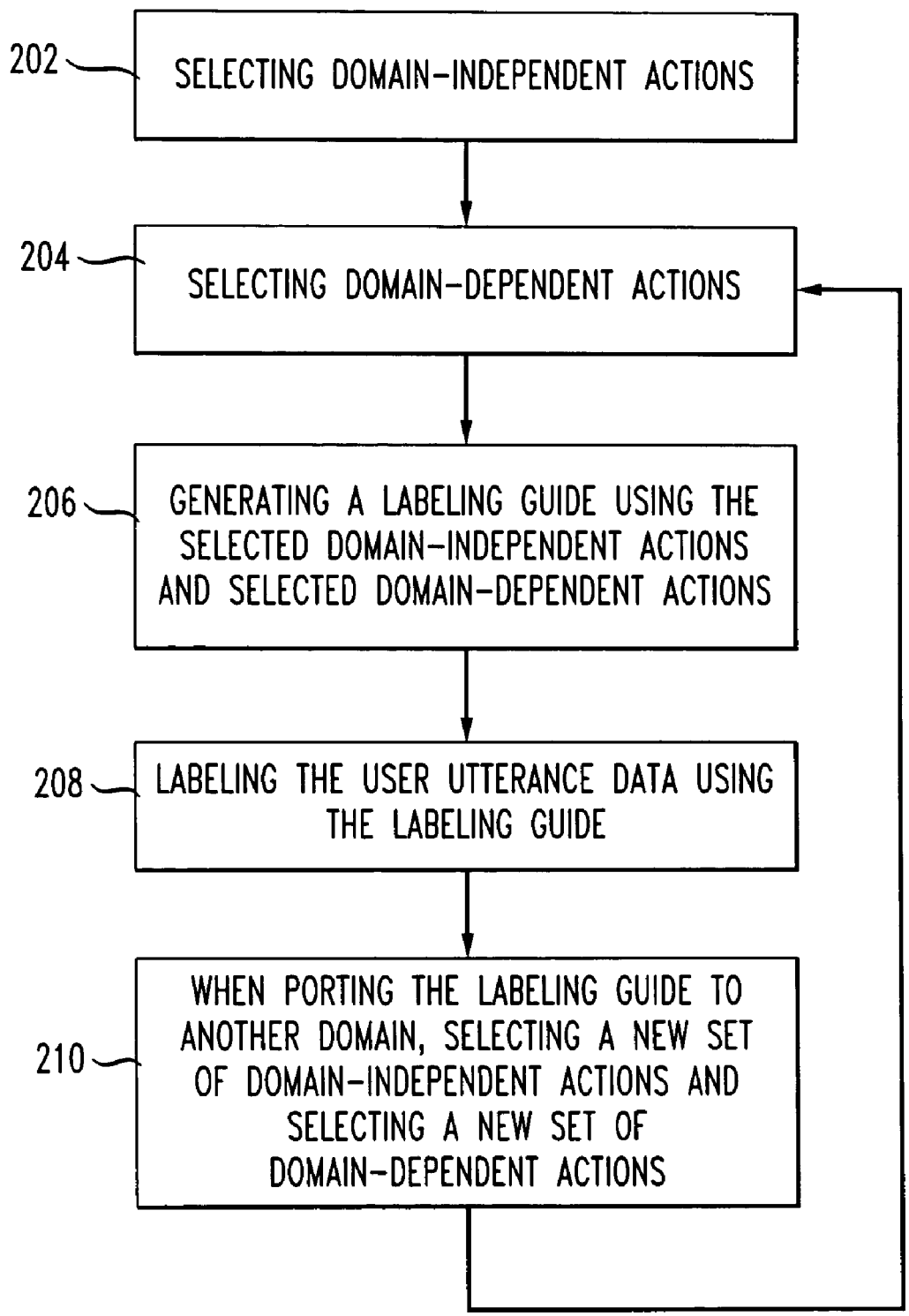
FIG. 2 illustrates an exemplary process for generating a labeling guide according to an embodiment of the invention.

According to the invention, user's utterances should be labeled with the intent of the speaker as opposed to the action that the system must take in response. Once the intent is captured, changes or extensions in application only require changes in the responses to the intents. To capture the intent, a two-tiered tagging scheme is proposed. FIG. 2 illustrates an exemplary flow-chart for the method of the present invention. The first tier of each Label (tag) may be a domain-independent verb (also referred to as predicate) that reflects the action the user is trying to perform by the utterance. A labeling guide designer selects domain-independent actions (202) according to this first tier organization. These predicates are sometimes also referred to as Dialog Acts but will generally be referred to herein as domain-independent actions. The designer may select a set of domain independent actions from a pre-existing set that may be derived from a previous labeling guide or from other documentation. In other cases, the designer may generate a new set of domain-independent actions for an application. Clearly, as more sets of domain-independent actions are developed, the more these existing sets will be used and drawn upon for newly developed labeling guides.

Included within the file history of the present application is an example labeling guide generated according to this two tiered approach. This labeling guide is incorporated herein by reference. This example labeling guide is for a telecom industry customer care application. Labelers who use the information contained in the labeling guide listen to numerous calls and label each call according to calltypes and other information. For example, in this labeling guide, there are five groups of calltypes in a verb(noun) format: Billing for general billing services; Service for general service queries; Named Entities for specific data items requested or supplied by the caller; Discourse for generated speech used when the user converses with the system; and Miscellaneous. Other calltypes are contemplated and will come within the scope of the invention.

An example of a calltype in the verb(noun) format is Combine(Account). This is for when a caller wants only one bill from the company for all user accounts. For example, the caller wants to receive their charges on another company's bill—such as they desire to have their Verizon bill shown on their AT&T account. The "Combine" first-tier component of this calltype is independent from the domain and reflects a user intent or a general action (combine account) that the user desires. The "noun" or "Account" second-tier portion of the calltype reflects the domain-related objects, action or concept (also known as argument) on which the first-tier action is being performed. In this case, the user desires to "combine" "accounts."

Since the meaning of domain-independent actions remain the same across the applications, one could use data from other applications to build the models for a new application. One could directly use the same data in a new application if the domain objects offered in the previous application were the same as in the new applications. For example, many applications deal with "Bills" and caller requests are commonly requests for an explanation of their bill. In such fortunate cases, data previously labeled by "Explain(Bill)" can be directly used for the new application. In other cases, a labeling guide designer would have to transform the data to make it suitable for the new application. In the telecom domain, for example, if a labeling guide designer has data labeled for Report(Service_Problem), the designer could use this data for a software company that attends to the software problems, i.e., Report(Software_Problem), by replacing the phrase that points to the service problem with those indicating a software problem.

An example of the steps necessary to manage this portability follows: the utterance "I have a <Company> corporate calling card it doesn't work I want to know why" having a calltype of Report(Service_Problem) can be changed to "I have a <Company> tax software it doesn't work I want to know why" having a calltype of Report(Software_Problem) by simply changing the "corporate calling card" which is a domain object in the telecom domain to "tax software" which is a domain object for the software company. Such modification to previously labeled data can be done automatically by using pattern recognizers of domain objects and actions. The terms "actions" and "objects" and/or "concepts" that reflect the arguments or subject matter of a domain independent or domain-dependent analysis are used interchangeably and may have a broad or narrow meaning depending on the concept of the use of any particular term.

After the labeling guide designer identifies and selects the domain, the second-tier action constitutes the domain related objects actions or concepts (also referred to as arguments) on which this action (from first tier) is being performed. Some examples of predicates from the first tier follow—Request: an utterance embodying a request for specific object; Tellme: an utterance in which there is a request for specific information; Report: an utterance in which some information is being reported; Verify: an utterance in which there is a request to verify something; Explain: an utterance embodying a request for some observation.

Some further examples of the arguments (the second tier) from a transactional domain are Credit, Payment, and Bill_Charge. Having identified the domain-dependent objects and concepts, a list of labels (tags) can be generated by joining them with domain independent predicates—for example: Request(Credit), Verify(Payment), Explain(Bill_Charge), and Report(Payment).

For illustration purposes, some examples of the utterances and their labels from this set are given below.

Utterance: "I see charges on my bill that I do not understand" Label: Explain(Bill_Charge)

Utterance: "I am just wanting to tell you that I have made the payment" Label: Report(Payment)

Utterance: "I am calling to check if you received my payment" Label: Verify(Payment)

Notice that by separating domain-dependent aspects from domain-independent aspects of labeling provides a systematic method to create a labeling guide. Once labelers understand the semantics of predicates, they only need to learn to spot the domain-dependent object/concepts in the utterances from a new and different application. This reduces the complexity and training necessary when training labelers for new applications. These labels capture the intents embedded in the utterance; therefore changes/extensions in application only require changes in the responses to the intents and do not require re-labeling of data. Since the labeling scheme captures the intent that is consistent across applications, it is possible to use data labeled for one application for developing other applications. For example, data labeled as Request(Credit) can be used for all applications where a caller is likely to ask for credit.

Embodiments within the scope of the present invention may also include a labeling guide generated according to the process described above. In this regard, such a labeling guide will be similar in general principles to the labeling guide incorporated discussed above that is incorporated herein by reference.

Although the above description may contain specific details, they should not be construed as limiting the claims in any way. Other configurations of the described embodiments of the invention are part of the scope of this invention. For example, some aspects of the process of generating a labeling guide may be automated where possible. In this regard, although the general description of the invention above relates to a more manual process of labeling guide designers selecting domain-independent and domain-dependent objects, some of these may be presented and selected in a software or multi-media electronic context and such applications are considered within the scope of the invention. Accordingly, the appended claims and their legal equivalents should only define the invention, rather than any specific examples given.

We claim:

1. A method of designing a labeling guide for use by a labeler in labeling data used for training a spoken language understanding (SLU) module for an application, the method comprising a labeling guide designer:
   selecting domain-independent actions applicable to an application;
   selecting domain-dependent objects according to characteristics of the application; and
   generating a labeling guide using the selected domain-independent actions and selected domain-dependent objects.

2. The method of claim 1, wherein selecting a set of domain-independent actions further comprises selecting the set of domain-independent actions from a preexisting set of domain-independent actions.

3. The method of claim 1, wherein selecting domain-dependent objects further comprises selecting domain-dependent objects according to a pre-existing set of domain-dependent objects.

4. The method of claim 2, wherein the pre-existing set of domain-independent actions comprises at least verify, explain and tellme actions.

5. The method of claim 1, wherein the generated labeling guide may be used for different applications wherein a labeling guide designer only needs to select domain-dependent objects according to characteristics of the different application.

6. The method of claim 4, wherein the verify, explain and tellme domain-independent actions have a calltype of verb (noun).

* * * * *